Feb. 9, 1937.  W. J. PASINSKI  2,070,060
CASH REGISTER
Original Filed Sept. 15, 1933   6 Sheets-Sheet 1

INVENTOR
Walter J. Pasinski
BY
Rector, Hibben, Davis + Macauley
ATTORNEYS

Feb. 9, 1937.  W. J. PASINSKI  2,070,060
CASH REGISTER
Original Filed Sept. 15, 1933    6 Sheets-Sheet 4

INVENTOR
Walter J. Pasinski
BY
Rector, Hibben, Davis + Macauley
ATTORNEYS

Feb. 9, 1937. W. J. PASINSKI 2,070,060

CASH REGISTER

Original Filed Sept. 15, 1933   6 Sheets-Sheet 5

Fig. 9.

INVENTOR
Walter J. Pasinski
BY
ATTORNEYS

Feb. 9, 1937. W. J. PASINSKI 2,070,060
CASH REGISTER
Original Filed Sept. 15, 1933 6 Sheets-Sheet 6

INVENTOR
Walter J. Pasinski
BY
Rector, Hibben, Davis & Macauley
ATTORNEYS

Patented Feb. 9, 1937

2,070,060

UNITED STATES PATENT OFFICE 2,070,060

CASH REGISTER

Walter J. Pasinski, Howell, Mich., assignor to Burroughs Adding Machine Company, Detroit, Mich., a corporation of Michigan Application September 15, 1933, Serial No. 689,657
Renewed September 28, 1936

20 Claims. (Cl. 235—15)

This invention relates to cash registers and more particularly to a key coupler and preset mechanism for a cash register.

In many installations cash registers are in continuous service, that is, they are continuously operated by one operator over a period of several hours. An example of such a use is in cafeteria or restaurant service, where customers or waiters pass continuously one or more cashiers or food checkers over a period of several hours. In such installations as this it is highly desirable, if not absolutely necessary, that the key action of the register be very easy both as to lightness of touch and uniformity of depression pressure throughout the full stroke of the keys.

It is the general purpose of this invention therefore to provide an improved cash register particularly with respect to the ease of operation.

It is a further object of this invention to provide a novel key coupler for a cash register.

It is still a further object of this invention to provide a novel presetting mechanism for a cash register.

Other objects will appear to those skilled in the art as a consequence of the many novel features of construction, arrangement and combination of elements from the following description given in connection with the drawings in which,—

General construction

The cash register mechanism is mounted and carried between right and left metal side or end plates 1 which support the entire mechanism and are maintained in spaced relation by tubular cross members 2 and by the various shafts constituting part of the cash register mechanism. This construction which supplants the older form of cast frame construction reduces weight while maintaining rigidity, facilitates assembly and storage of the machine elements.

Figure 10:
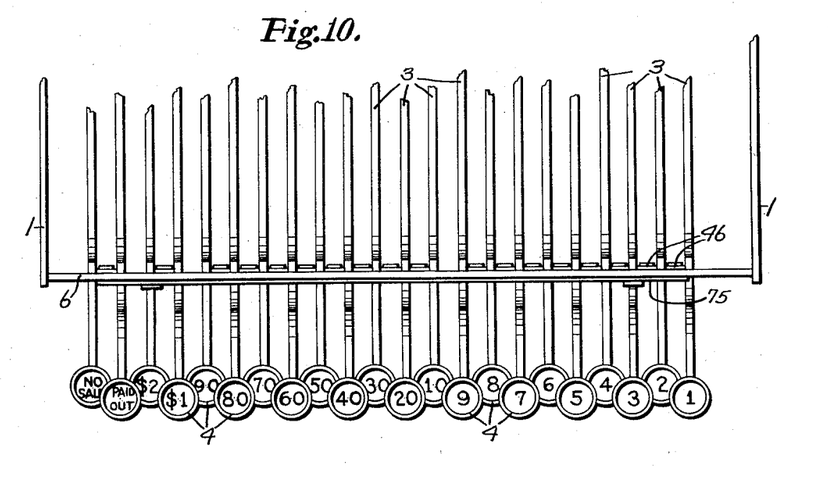
Fig. 10 is a partial plan view of the front portion of the machine showing the keyboard arrangement of the units, tens, dollars and character sections of the machine.
Figure 11:
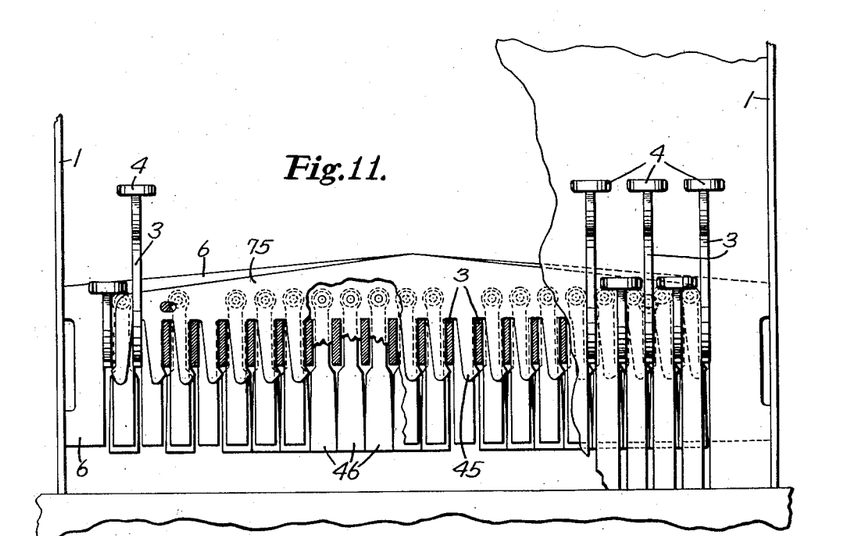
Fig. 11 is a partial front elevation showing the keyboard arrangement with certain of the key levers cut away to illustrate more clearly the pendant interlocks.

Two rows of depressible key levers 3 having key tips 4 upon their outer ends and of the necessary number for each denomination are rotatably supported by a cross shaft 5 journaled in the end plate 1. The keys extend forwardly through a slotted front plate 6 (Figs. 10 and 11) and through the outer casing.

The keys are urged clockwise about shaft 5 by compression springs 7, the upward movement of the keys being limited by the upper ends of the slots in front plate 6. Each key has a rearwardly and upwardly extending arm 9 which engages a hollow shaft 10 of a universal bail and terminates in a cam slot 11. The slots of each key are of different inclinations and constitute the means for differentially indexing the registers as well as the indicators as will be later explained.

Shaft 10 is supported at each end by one arm of full stroke levers 12 secured to shaft 5 at each side of the machine. Shaft 10 extends through the side plates 1 passing through arcuate slots 13 formed therein which slots limit the forward and backward movement of shaft 10. Full stroke levers 12 and shaft 10 are constantly urged clockwise by springs 14 having one end of each attached to the side plates 1 and the other ends of each attached to lower arms 15 of the full stroke levers 12. Shaft 10 and full stroke levers 12 constitute a universal bail that either directly or indirectly controls many functions of the machine in predetermined time sequence.

The upper ends of full stroke levers 12 terminate in full stroke racks 16 engageable by pawls 17 pivoted to each of the end plates 1 to insure a full stroke being made each time a key lever is depressed prior to return thereof. Pawls 17 are urged to normal and vertical position by means of springs 18 and cams 19 pivoted to the end plates, the latter being provided with heart shaped cam openings 21 which engage pawls 17 and in conjunction with springs 18 force the pawls 17 to vertical or normal position.

It follows from the foregoing that depression of any of the key levers 3 through the rearwardly upstanding arms 9 urges the universal bail comprising shaft 10 and levers 12 forwardly against the action of springs 14. This movement differentially positions the registers as well as the indicator tabs through the cam slots 11 as will later appear. After a full stroke has been taken as compelled by the full stroke racks and pawls the depressed keys are restored to normal position by springs 7 and the universal bail is restored to normal position by springs 14. The foregoing portions of the cash register are not described in greater detail being made the subject matter of my copending application Serial No. 689,656 filed September 15, 1933.

*Key coupler*

In many instances heretofore it has been customary to employ heavy cast metal key couplers pivoted along or adjacent one longitudinal edge thereof which couplers are raised bodily by depression of the keys which move the heavy coupler bodily into coupling position. This places a heavy load on the keys and particularly at one portion of the key stroke.

To overcome this prohibitive load on the key levers and to overcome other objections to such a construction it is proposed to use an extremely light weight normally inactive key coupler which performs two functions. First, it serves to carry all partially depressed keys to fully depressed position when one key is fully depressed and, second, it acts as a latch to latch all pre-set keys in pre-set condition. The coupler is preferably pivoted intermediate its longitudinal edges, is substantially balanced about its pivot, and is so arranged that it need only be rocked a very slight degree about its substantially centrally located pivot to place it in operative position.

On the other hand it does not perform the function of preventing undepressed keys from being depressed after one or more depressed keys have been moved a predetermined distance. An independent interlocking device later to be described is employed for locking the undepressed keys against depression after one or more keys have been moved past preset position. A further feature of the key coupler is that the key coupler is not moved into operative position by the key levers, but is simply released for movement into the path of movement of the key levers or into coupling position. This construction further reduces the load placed upon the keys or driving motors.

By this proposed construction the energy necessary to operate the cash register or to place the cash register in preset condition, that is, with the coupler in coupling condition, is reduced to a minimum and practically no load is placed upon the operating keys.

As previously explained, the full stroke racks 16 and pawls 17 insure a full stroke being taken of the universal bail at each depression of a key prior to return of the universal bail. The racks and pawls, however, do not prevent the keys and key levers from returning to normal position after partial depression. The key coupler does prevent this by latching all partially depressed keys to the universal bail, and enforces the full depression of the keys that are so latched to the bail.

Figures 1, 2:
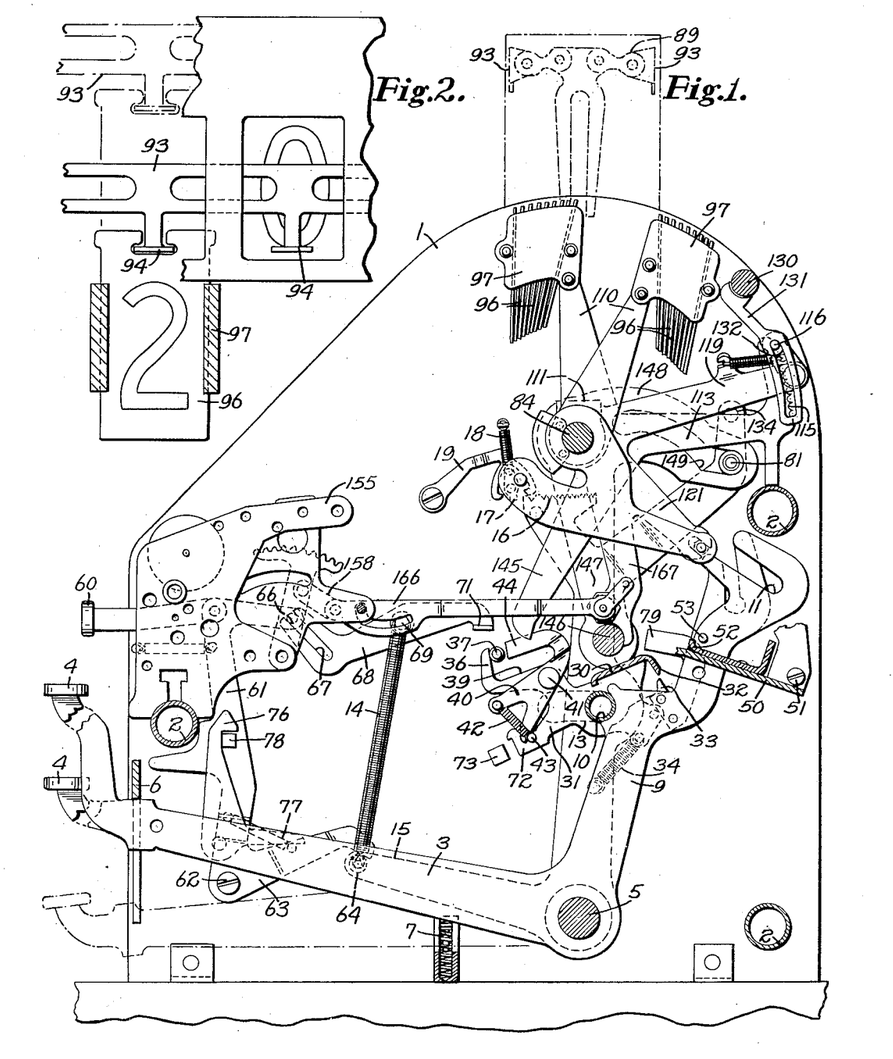
Figure 1 is a right side section of a cash register with the right side plate removed showing the means for indexing the indicator tabs, the register controls, the key coupler mechanism, and the actuating keys all in normal position.
Fig. 2 is a fragmentary front elevation of the indicator tabs and tab raising bail.

Accordingly a key coupler 30 is provided preferably made of sheet metal in the form of a yoke extending across the entire width of the machine, the cross bar of which is channel-shaped and terminates in a pair of arms 31 journaled upon the universal bail shaft 10 adjacent each end thereof and at points intermediate the ends of the arms of the coupler 30 so that the coupler is substantially balanced and may be rocked about shaft 10 with a minimum of effort. The rearwardly and downwardly extending edge or lip 32 of the cross member of the bail or coupler is adapted to engage lugs 33 extending upwardly from each of the key levers. The coupler is urged clockwise by a pair of springs 34 disposed at each end of the coupler so as to normally urge lip 32 into the path of movement of lugs 33. The key coupler, however, is held in inoperative position disengaged from the key levers and out of the path of movement of lugs 33 as shown in Fig. 1 by forwardly and upwardly extending fingers 36 formed integrally with arms 31 which fingers, when the machine is in normal position, engage studs 37 fixed to and extending inwardly from each of the end plates 1 to withhold the coupler from latching or coupling position.

Upon forward movement of shaft 10 caused by initial depression of any key the forwardly extending fingers 36 move away from studs 37 and the key coupler is thereby unlatched or released to rotate clockwise under the action of springs 34, which yieldingly move the coupler into the path of movement of lugs 33 of undepressed keys or behind lugs 33 of all partially depressed keys.

Key coupler 30 is maintained in proper relation to the keys throughout the full forward and return stroke of the universal bail and key levers by studs 37 which engage the horizontally inclined upper edges 39 of the arms 31. At the end of the return stroke fingers 36 reengage stud 37 and rock the key coupler counterclockwise to normal or inoperative position out of the path of movement of projections 33. The coupler being in engagement with lugs 33 of all partially depressed keys which are thereby attached thereto it is only necessary to depress any one of the coupled keys to the fully depressed position. In other words only one key need be depressed the full downward stroke because all previously partially depressed keys are latched to the key coupler and all keys will be carried down the full stroke by the depressed key.

The foregoing construction permits the operator of the cash register to partially depress or preset, as it is termed, any number of keys, and then carry them along to fully depressed position by the use of only one hand or one key which causes depression of all the keys regardless of whether pressure is placed on one or more keys or whether the pressure is evenly placed upon one or more keys. The latching of each partially depressed key to the coupler insures that the registers and characters will be indexed in accordance with the depressed keys which would not be true if the partially depressed key could resume normal position. Presetting of a key, i. e., movement thereof to partially depressed position where it is latched to the key coupler may be accomplished by a special key as will be later explained.

It is desirable that each denomination of keys, that is the cents keys, the dimes keys, the dollar keys and the character keys be latched as groups to the coupler. The rear depending lip 32 is therefore stepped into sections as at 38 (Fig. 7), the sections being of successively greater height from the cents keys section to the character key section which means, of course, that depression of a higher order key from normal position to preset or latching position will release from the bail all keys of lower denominations or orders, that is, if a dollar key is partially depressed from normal to preset position it will release all dimes and cents keys because the section of the bail or coupler to which the dollar key is latched has a lip of greater height than the lip of the dimes or cents sections and the coupler is accordingly raised high enough to unlatch all but the dollar key depressed. The reverse condition, however, is not true because depression of a lower order key when a higher order key has been previously depressed will not raise the coupler sufficiently to release the higher order key. This is true because the lip of the section of the key coupler engaged by the lower order key is less in height than the section of the lip engaged by the higher order key. The higher section of the coupler, however, will not interfere with the depression of a lower order key because it is not engaged thereby, but being higher it will not be raised clear of this latched higher order key upon depression of a lower order key.

Overthrow preventing mechanism

Figures 7, 8:
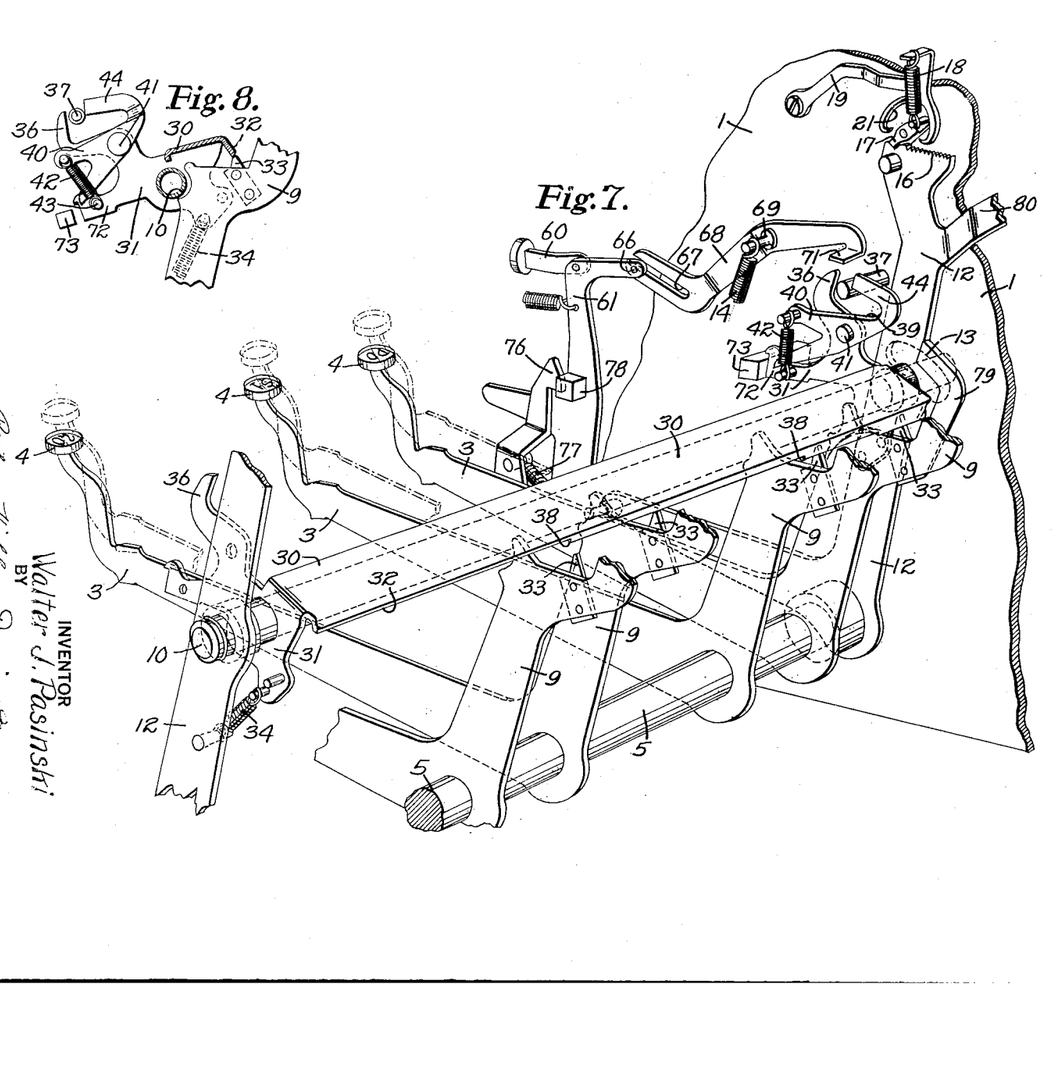
Fig. 7 is a perspective view from the rear showing the key coupler bail in preset position with the paid-out key and a dollar key in preset position, a tens order key depressed only to the extent of raising the coupler bail and before the latter is dropped behind the key in preset position, and a units order key in normal position.
Fig. 8 is a fragmentary detail illustrating the coupler overthrow preventing mechanism, the parts being shown in active position.
Figure 9:
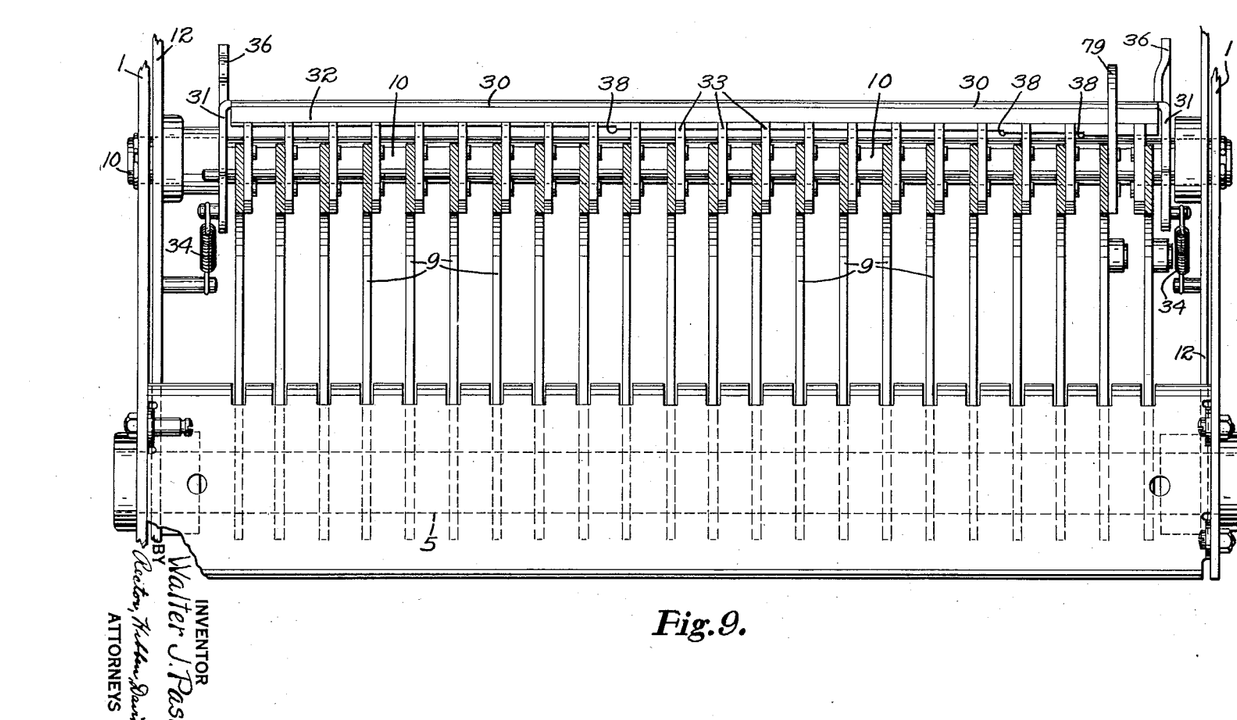
Fig. 9 is a partial sectional rear elevation showing the different orders of key levers and their relationship to the stepped key coupler bail.

To prevent overthrow of the key coupler by abuse of the machine or too rapid depression of one of the key levers, particularly when the machine is in preset condition, an overthrow preventing mechanism is provided. This mechanism although not necessary in the normal use of the machine is incorporated to prevent the momentum of the key coupler from carrying it too far in its rocking movement as might be occasioned by a "banging" of the keys. This mechanism consists of a three-armed lever 40 pivoted at 41 to the left hand support or arm 31 of the coupler. The lever is urged counterclockwise by a spring 42 until one of its arms abuts the stud 43 carried by arm 31 in which position the upper and forwardly projecting finger 44 is in position to engage stud 37 upon slight counterclockwise movement of the coupler. During rocking movement of the coupler caused by lugs 33 passing under lip 32 as shown in Fig. 8, when a key is moved to preset position, finger 44 will engage stud 37 and offer a slight resistance to movement of the coupler just sufficient to prevent overthrow of the coupler beyond the position shown in Fig. 8. The resistance offered by the spring pressed lever or finger 44 will vary in accordance with which key is being depressed. The resistance will be at a maximum when a character key is depressed due to the increased height of the step of that section of lip 32 corresponding to the character section of keys. The resistance will be at minimum when a tens key is depressed and there will be no resistance when a cents key is depressed because finger 44 just clears pin 37 under depression of a cents key. The lift of the coupler in such a case is so slight that there is no necessity for an overthrow preventing action of finger 44. Finger 44 of course yields when the preset key is operated as will be later described.

Key locks

The machine is provided with the usual pendent locks 45 and 46 carried by plate 6 which engages the key levers on the slot in plate 6 to interlock the keys so that no more than one key in any one denomination may be depressed at one time and to prevent depression of an amount key when the no-sale key is depressed.

It is also necessary to provide some means to prevent depression of undepressed keys during completion of the downward stroke of one key. As previously stated this not accomplished by the key coupler as in many cash registers. During the early part of movement of a depressed key, key coupler 30 moves behind the lugs 33 of all partially depressed keys and into the path of lugs 33 of all undepressed keys. As the key depression continues, all depressed and partially depressed keys are carried downwardly with the key being depressed due to the latching action of the coupler. At this time all undepressed keys should be and are locked.

For this purpose a blocking bail 50 (Figs. 3 and 6) extending across the machine and pivoted at 51 to each side frame of the machine is actuated. The bail is provided with an upstanding lug 52 for each key lever, each lug being engageable with a pin 53 extending laterally from each key. The bail is normally urged counterclockwise to disengaged position by springs 54, one at each end of the bail.

During initial depression of any key a crank 55 having a depending finger 56 carrying a stud 57 is rotated as will be later explained. Stud 57 engages a finger 58 extending forwardly from one end of bail 50 and following preset movement of the universal bail rocks bail 50 clockwise causing its lugs 52 to engage pins 53 of all undepressed keys to prevent depression of those keys. At the extreme end of the return stroke of the depressed key the crank leaves finger 58 and permits bail 50 to resume its normal position under the influence of springs 54.

By relieving the key coupler of the function of locking the keys and utilizing instead a spring-pressed independent bail, the bail is moved only when necessary and the key action is relieved of unnecessary work which is one of the purposes of the present invention.

Preset mechanism

When entering an amount in the machine of two or more figures, it is not always convenient for the operator to use both hands to depress the necessary keys and frequently the two keys to be depressed are not within the reach of the fingers of one hand. Provision has been made therefore to enable the operator to preset one or a plurality of keys whereby the keys that denote the amount to be entered may be partially depressed and then any one key fully depressed to carry all the partially depressed keys down the full stroke to index and enter the entire amount.

It will be understood from the foregoing description that the key coupler functions to cause all partially depressed keys to be fully depressed upon full depression of any one key. The point at which the key coupler latches all partially depressed keys is known as the preset position or condition of the machine. At this position pawl 17 enters the first tooth of rack 16 in full stroke lever 12. It is difficult to determine the position unless some positive indication is given. Moreover, it is preferable to preset the machine, that is, move the key coupler to preset position in which position it is in the path of movement of lugs 33 of the key levers prior to depressing any keys, whereby any key may thereafter be depressed to preset position, that is, partially depressed and latched to the key coupler.

A separate preset key 60 is employed and is intended to be depressed prior to depression of the amount keys to place the machine in preset condition. Key 60 is pivoted to a crank 61 and upon being pushed inwardly rocks crank 61 clockwise about its pivot 62 causing a rearwardly extending arm 63 to engage a stud 64 carried by the forward end of arm 15 of the left hand full stroke lever 12. The pivotal point and length of the levers are such that upon depression and release of key 60 full stroke levers 12 and shaft 10 are moved forward until pawl 17 engages the first notch of the full stroke rack 16, at which point coupler 30 is permitted to rock clockwise under the action of springs 34 to coupling position as previously described.

In this position the key coupler has been rocked clockwise with its lip 32 into the path of movement of lugs 33 of undepressed keys. Inasmuch as the coupler may be rocked upwardly about shaft 10 against the action of springs 34 depression of any of the undepressed digit keys will rock the coupler and cause its lug 33 to be moved in front of lip 32 and be latched thereby in preset position.

It is necessary in entering a plural digit transaction in the machine to depress the keys in the order of dollars, dimes and cents because, due to the stepped lip of the key coupler, depression of the keys successfully from lower to higher orders will release all previously set keys leaving only the key being depressed in latched condition, whereas depression of the keys in the reverse order will release only previously set lower order keys leaving all higher order keys and the key being depressed latched to the coupler.

Figures 3, 4, 5:
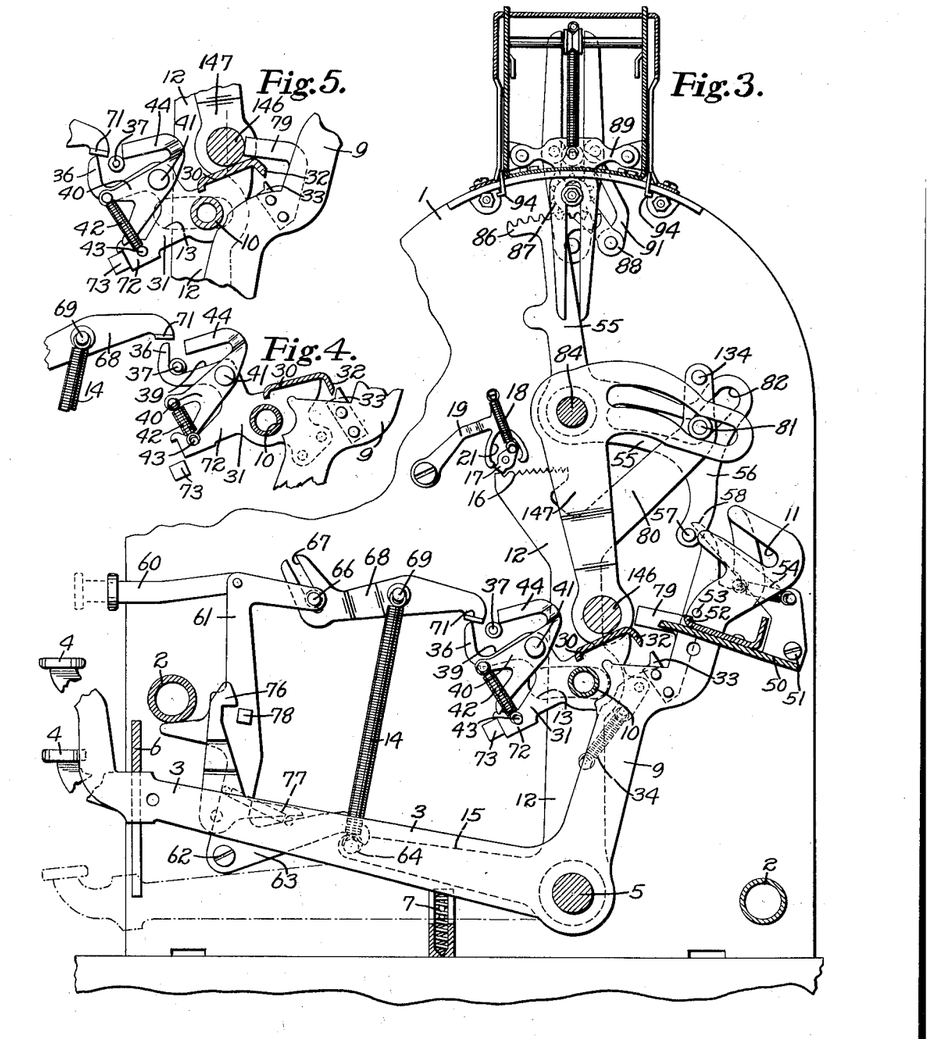
Fig. 3 is a right side sectional elevation with the right plate removed, the indicator magazines removed and certain other parts omitted to illustrate more clearly the machine in preset condition with the preset key in depressed position.
Fig. 4 is a fragmentary detail of the key coupler illustrating the parts in preset condition with the preset key having been depressed and released.
Fig. 5 is a fragmentary detail of the key coupler bail and the paid-out key, the latter being in depressed position.

Crank arm 61 has a rearwardly projecting finger carrying a stud 66 which travels in a cam groove 67 formed in the forward end of a lever 68 pivoted at 69 to the left side frame 1. The rear end of lever 68 is provided with a laterally projecting lug 71 which travels downwardly upon depression of preset lever 60 and engages finger 36 to rotate the key coupler counterclockwise when the lever or preset 60 is fully depressed until an arm or finger of locking lug 72 formed on arms 31 contacts square studs 73 projecting inwardly from each of the end plates Figs. 3 and 5. This locks further rocking of the coupler and also further forward movement of the universal bail. Release of the preset key 60 after it has been depressed allows bail 30 to move clockwise under tension of springs 34 until lugs 72 clear studs 73 as shown in Fig. 4, the coupler being limited in this position by engagement of stud 37 with edge 39 of the coupler arm. It will be recalled that the key levers and the universal bail are retained in preset position into which position they have been moved by depression of key 60, by the full stroke pawls.

Movement of the coupler and bail to preset position of course moves shaft 10 to preset position in which position shaft 10 is slightly ahead of the rear arm 9 of the key levers. When the keys are moved from normal to coupled position the only resistance offered is that of rocking the coupler as the lugs 33 pass under lip 32 of the coupler. This resistance is practically negligible. Shaft 10 then serves as a yielding limiting stop and indication of when the keys have reached preset position, the stop being set simultaneously with the presetting of the coupler.

Correction of errors

It is frequently desirable to correct an error made by the inadvertent or erroneous depression of one or more keys. This can be accomplished if the key has not been depressed beyond preset position by depressing fully the special preset key without affecting the indexing of the registers or tabs and consequently without affecting the final results of the machine. Any time an error is noted in the set-up, a second full depression of the preset key will rock bail 30 in a counterclockwise direction and will release all preset keys due to the engagement of lug 71 of lever 68 with finger 36 of arm 31 of the coupler. After this second depression of the preset key 60 the machine still remains in preset condition and the correct amount may again be set up on the keyboard.

Any key erroneously set up in a lower order may be released by depression of a key in a higher order if the lower order key were erroneously depressed instead of the higher order key. This, however, corrects only the keys in the lower orders than the one of the key depressed. Also by very careful manual manipulation of the preset key, that is by depressing it to the required degree, one or more keys may be released because of the stepped edge or lip 32. Unless one is skilled in the operation of the register, however, it is easier to depress the preset key fully and set up the correct amount on the keyboard.

Character keys

The present machine is provided with two character keys, i. e., a no-sale key and a paid-out key.

The no-sale key (Figs. 10 and 11) functions to cause a no-sale tab to be raised in the tab indicator. This key also operates a pendant interlock 75 depending across plate 6 to prevent depression of any other key simultaneously with depression of the no-sale key. The no-sale key does not operate or index either the registers or the digit indicating tabs.

The paid-out key P. O. Fig. 7 likewise raises a paid-out tab. In using the paid-out key contrary to the no-sale key it is desired to enforce the depression of a digit key whenever a paid-out transaction is performed. Accordingly, the paid-out key is interlocked with the preset key 60 by means of a latching pawl 76 (Figs. 1, 3 and 7) pivoted to the paid-out key and normally urged by spring 77 into latching relation with a stud 78 projecting from the side of crank 61 thereby necessitating depression of the preset key to remove stud 78 from the path of latching pawl 76. By depressing preset key 60 crank 61 is moved forward to carry stud 78 out of engagement with latching pawl 76 after which the paid-out key may be depressed to preset position to latch it to the key coupler. Further depression of the paid-out key is prevented, however, by contact of the forwardly projecting finger 79, Fig. 5, secured to the rear and upper arm of the paid-out key lever with a return bail later to be described. The rear upper arm of the paid-out key lever is cut away so as not to engage hollow shaft 10 whereby the key coupler and shaft 10 are not moved forwardly upon depression of the paid-out key. It is therefore necessary to depress an amount key or digit key which will register and indicate an amount and carry with it the paid-out key which is now latched to the coupler and cannot be released unless the preset key is again depressed as in correcting for an error.

Indicator mechanism

The cash register is designed to operate an indicating mechanism which may be read in correct reading direction from either side, that is, front or rear of the cash register, by the following mechanism. Each of the full stroke levers 12 is provided at its upper and rear ends with rearwardly and upwardly extending arms 80 carrying studs 81 which project laterally from both sides of the arms. From one side of the arm studs 81 engage a cam slot 82 formed in each of the two cranks 55 pivoted on shaft 84 extending across the machine, one crank being on each side of the machine, only one being shown. The upper ends of cranks 55 are provided with toothed sectors 86 meshing with pinions 87 disposed at each side of the machine and pivoted on studs secured to the side frames 1. To each gear 87 is secured an arm 88 which is connected to an indicator bail 89 by a link 91 whereby reverse rotation of gears 87 will reciprocate bail 89 vertically. The bail 89 is provided with a pair of cross arms 93 preferably colored so as to be readily visible for reasons later to appear and being provided with laterally extending hooks 94 for each denomination of tabs 96.

The tabs are contained in tab magazines 97, there being a magazine at each side of the machine for each denomination, that is, a front and rear magazine, or pair for the cents, a pair for the dimes and a pair for the dollars so arranged that the indicator tabs may be read in reading direction from left to right from both the front and rear of the machine. The magazines for the same denomination on each side of the machine are carried by integral yokes so that they are indexed simultaneously during the portion of the key depression after preset position. The bail 89 is immediately lowered in moving the digit keys or preset key to preset position as shown in Figs. 2 and 3 due to the immediate action of cranks 55. In this position the colored arms 93 will be visible and easily detectible to give notice to the clerk, manager and customer that a transaction has been started but not completed. The indexing of each pair of magazines is substantially the same and therefore will be described in connection with only one pair.

Figure 6:
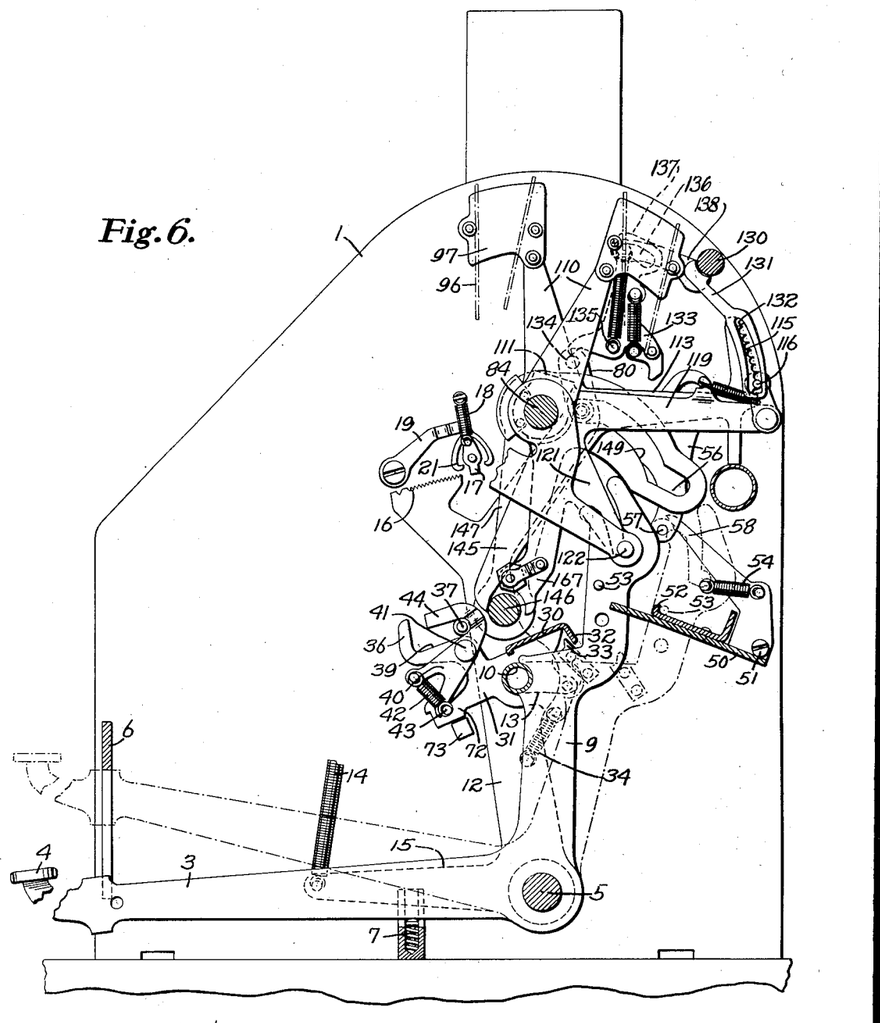
Fig. 6 is a right side sectional elevation with the right plate removed and showing the machine with one of the digit keys fully depressed.

A pair of magazines for each denomination is secured to the upper ends of arms 110, Figs. 1 and 6, bridged and connected by a magazine yoke 111 freely journaled on the stationary shaft 84. The yoke 111 has a third and rearwardly extending arm 113 provided upon its free end with rack teeth 115, adapted to be differentially engaged by a pin 116 adjustably carried upon the outer end of an arm 119 of an indexing yoke having an integral forked arm 121 engaging a bail 122. Bail 122 is engaged by any one of the differential cam slots 11 in the upper extensions of the keys within one denomination. It will be understood that the foregoing mechanism is repeated for each denomination of keys, that is for the cents keys, dimes keys and dollars keys, and each pair of magazines will be indexed according to the key depressed in its corresponding denomination.

Pins 116 are released from and engaged with teeth 115 in sequence to permit the magazines to resume normal position at each operation of the machine and thereafter to move the magazines to indexed position. This connection and disconnection of bail 122 with arm 113 through pin 116 and arm 119, that is the movement of pin 116 is accomplished by oscillation of a shaft 130 journaled in the side plates 1. Shaft 130 carries an arm 131 provided with a closed slot 132 into which pin 116 extends. Shaft 130 is rocked by means of a pivoted lever 133 pivoted at 135 and which is engaged by a stud 134 carried upon the upper extremity of arm 80 of the full stroke lever 12. The upper end of lever 133 is provided with a cam slot 136 into which projects a pin 137 carried by the end of an arm 138 fixed to shaft 130. Upon oscillation of lever 133 by engagement of stud 134, arm 138 is rocked thus rocking shaft 130 to cause engagement and disengagement of pins 116.

The tab magazines are returned to normal position immediately after preset position is reached and are indexed to the new position upon a portion of the upward or return movement of the key levers. The tabs are again raised to visual position at the final upward movement of the key levers.

As previously stated, the tab magazines are freely journaled on shaft 84 and normally return to normal position by gravity. To insure positive return of these magazines should they fail to return by gravity, the magazine yokes 111 are provided with downwardly projecting arms 145 positioned to be engaged by a return bail 146 extending across the machine and supported at each end by one arm 147 of cranks disposed at each side of the machine journaled on shaft 84. The other arms 148 of the cranks have cam grooves 149 therein into which extend the other projecting ends of studs 81 carried by arms 80 of the full stroke levers 12. Therefore upon operation of the full stroke levers which occurs once for each machine operation, crank arms 148 and 147 are rocked to swing the bail 146 into contact with those arms 145 of the magazine which may not have returned to normal position by gravity. The indicating mechanism is not described in greater detail, being made the subject matter of my copending application, Serial No. 689,658 filed September 15, 1933, to which reference is made for further details.

Register indexing

A register 155 assembly for accumulating and totaling the amounts entered into the machine (Fig. 1) is secured to the side frames of the machine adjacent the front thereof.

Each of the register wheels of the sections is actuated by a link 166 pivoted at one end to an arm 167 depending from each of the magazine yokes. The opposite ends of links 166 are connected to the register wheels by a toggle linkage 158. The specific register operating means and controls are not described in greater detail, being made the subject matter of my copending application, Serial No. 689,657, filed September 15, 1933, to which reference is made for further details.

Operation

Operation of the key coupler, universal bail, presetting mechanism and associated elements will be apparent from the foregoing description. With this in mind it will only be necessary to summarize briefly the functions and operations of the mechanism heretofore described.

Referring to Fig. 1 it will be observed that the key coupler is normally out of the path of movement of the key levers, and that if the key coupler were not moved into an operative position, it would not engage projection 33 on the key levers. In other words, the key coupler is not only normally inactive, but incapable of being active, but is capable of being unlatched and permitted to move into the path of projections on the key levers so as to latch the key levers thereto and to the universal bail which is controlled by the full stroke racks and pawls. The result of the foregoing construction is that it is not necessary for the keys to raise a heavy key coupler or in fact any key coupler at all. It is only necessary to rock the universal bail slightly to release the key coupler so that it may be actuated by its springs to be placed in coupling position. The preset key also moves the coupler from an inactive, that is, an impossible active position to active or operative position into the path of projections 33 on the key levers. At the same time the preset key moves a determinable limiting stop and indicator for the keys so that preset position cannot possibly be passed over without full knowledge of the operator. Furthermore, the preset key is also an error key, whereby corrections in the keys set up may be made.

It is an important fact that the universal bail, the key coupler, the key lock or blocking bail as well as the other elements of the machine are all supported, controlled and/or actuated from both sides of the machine simultaneously. This prevents any twisting of the parts and increased resistance due to the twisting.

Reviewing the sequence of operations:—upon the initial depression or portion of downward movement of the digit keys or upon a full depression of the preset key, the universal bail and the coupler are rocked to preset position, in which position pawl 17 engages the first tooth in the full stroke rack 16. Upon further depression of a digit key the independent blocking bail 50 is moved into position. When in preset position the key coupler is free to oscillate whereby digit keys may be moved, that is, latched to the key coupler, after which it is only necessary to depress one key to carry all of the latch keys to full depressed position. In other words, the machine is first moved from position shown in Fig. 1 to the preset position in Fig. 3 but with the preset key 60 released as shown in Figs. 1 and 4. This occurs upon the first portion of the movement of the digit keys or upon manual depression of the preset key 60. In this position the blocking bail 50 is not operative and keys may be partially depressed to be latched to the coupler as shown in Fig. 7. From preset position depression of any digit key will carry any latched keys to full depressed position shown in Fig. 6. In this position the blocking bail is in operative position. Upon return to upper or normal position of the key levers the machine again assumes the position shown in Fig. 1.

Referring to Fig. 7 there is shown several stages of depression of the various keys. The character key, in this case, the paid-out key, has been moved to preset or latching position in which it is latched to the key coupler. The dollar key is also in preset position or in other words is latched to the key coupler. The projections 33 of these two keys are in front of the lip 32 of the key coupler. The dimes key has been moved to a position where its projection 33 is immediately under its corresponding section or step of the lip 32. This position is also shown in Fig. 8, it being understood that the key must be manually held in this position to be retained there as otherwise it merely passes through this position. The cents key has not been depressed at all and accordingly its projection 33 lies well to the rear of its section of the lip 32 of the key coupler. Upon full depression of either the character key, or upon continued depression of the dollars key, or the dimes key, assuming that it had been held in the Fig. 7 or 8 position, all three keys of the carriage will go to full depressed position, the machine then assuming the position shown in Fig. 6.

From the foregoing it will be apparent that there has been provided a very light, easily operated key coupler and preset mechanism which places very little, if any, load upon the keys, and accordingly with the result that a very light key action may be obtained by the use of such a coupler and preset mechanism. Other inherent and novel advantages and corresponding results will be apparent to those skilled in the art to whom it will also be obvious that minor changes may be made in the details of construction without departing from the spirit and scope of the invention as defined in the claims.

I claim:

1. A key coupler for use in cash registers comprising a cross bar of sufficient length to extend across the desired number of key levers, said cross bar having a depending longitudinal lip adapted to engage the key levers, said lip being stepped to provide steps of different heights whereby different keys may be latched and released at different positions of said coupler.

2. A key coupler for use in cash registers comprising a cross bar of sufficient length to extend across the desired number of key levers and terminating in arms disposed substantially perpendicular to said cross bar, said cross bar having a depending longitudinal lip adapted to engage the key levers and said lip being stepped to provide steps of different heights whereby different keys may be latched and released at different positions of said coupler.

3. In a key operated cash register, depressible amount keys, a single key coupler normally inoperative and movable into the path of movement of all of said keys to latch the latter thereto upon predetermined depression of said keys and an independent key for moving said coupler to inoperative position to release all keys latched thereto following movement of said coupler to latching position, said coupler returning immediately to latching position upon release of said independent key.

4. In a key operated cash register, depressible amount keys, a universal bail actuated by said keys, a single normally inoperative key coupler controlled by said bail and movable into the path of movement of all of said keys to latch the latter thereto upon predetermined depression of said keys and an independent key for moving said coupler to inoperative position to release all keys latched thereto following movement of said coupler to latching position.

5. In a key operated cash register, depressible amount keys, a universal bail actuated by said keys, a single normally inoperative key coupler carried by said bail and movable into the path of movement of all of said keys to latch the latter thereto upon predetermined depression of said keys, said coupler being movable, following partial depression of said keys and movement of said key coupler to latching position, to permit additional keys to be latched thereto and an independent key for moving said bail to move said coupler to inoperative position to release all keys latched thereto.

6. In a key operated cash register, a plurality of banks of depressible pivoted keys, and a single pivoted key coupler having means for latching said keys thereto when depressed either simultaneously or consecutively, said coupler being engageable with all of said keys, means for yieldingly urging said coupler about its pivot into engagement with said keys, means normally holding said coupler out of engageable position with said keys, means controlled by said keys for releasing said coupler upon partial depression of said keys for movement about its pivot by said yielding means to engageable position with all of said keys including depressed and undepressed keys whereby all keys in engagement with said coupler and all additional keys later partially depressed and engaged therewith will be fully depressed upon complete depression of any one key.

7. In a key operated cash register, depressible keys, a key coupler, said coupler and keys being movable relatively to each other to permit coupling of the keys to said coupler, means for normally retaining said coupler and keys uncoupled, and means normally ineffective but effective upon key depression for resisting the relative movement between said coupler and keys to prevent excessive relative movement, said coupler also being movable with said keys to cause depression of all keys coupled thereto upon depression of any one of said keys.

8. In a key operated cash register, depressible keys, a key coupler, said coupler and keys being movable relatively to each other to permit coupling of the keys to said coupler, means for normally retaining said coupler and keys uncoupled and a pivoted spring pressed lever carried by said coupler and arranged to yieldingly resist movement of said coupler relatively to said keys to prevent excessive relative movement, said coupler also being movable with said keys to cause depression of all keys coupled thereto upon depression of any one of said keys.

9. In a key operated cash register, a plurality of banks of depressible pivoted keys, a single unitary pivoted key coupler normally held out of engageable position with said keys and being releasable upon partial depression of said keys for pivotal movement into engageable position with all of said keys, said coupler being capable of limited movement when in engageable position and having coupling portions so arranged that keys of banks other than those previously engaged may be engaged while said coupler is in engageable position.

10. In a key operated cash register, a plurality of banks of depressible keys having latching means thereon, a single unitary pivoted key coupler adapted to be coupled to all of said keys, means for normally retaining said coupler and keys uncoupled, said coupler being movable about its pivot into coupling relation with said keys and being movable bodily with its pivot and by said keys to cause depression of all keys coupled thereto upon depression of any one of said keys, said coupler having coupling portions to arranged whereby keys of banks other than those previously coupled thereto may be coupled to said coupler after the latter has been moved to coupling relation and means for yieldably maintaining said coupler in coupling position when moved thereto.

11. In a key operated cash register, a plurality of banks of depressible pivoted keys having latching means thereon, a single unitary key coupler normally out of the path of said means and movable into position behind said means to latch all of said keys to said coupler, and means operable by said keys to move said coupler into latching relation with said key latching means, said coupler being free for limited movement when in latching relation to said keys and having coupling portions so arranged that keys of banks other than those previously latched thereto may be latched to said coupler when the latter is in latching relation.

12. In a key operated cash register, a plurality of banks of depressible pivoted keys, a universal bail operated thereby, and a single unitary key coupler pivoted to said universal bail and normally held out of engageable position with said keys and being releasable upon movement of said universal bail upon partial depression of said keys for movement into engageable position with all of said keys, said coupler having coupling portions so arranged that keys of other banks than those previously engaged by said coupler may be engaged thereby when said coupler is in engaging relation to said keys.

13. In a key operated cash register, a plurality of banks of depressible pivoted keys, a single unitary pivoted key coupler adapted to engage all of said keys, and being substantially balanced about its pivot, means for normally retaining said coupler out of engagement with said keys, means for disabling said latter means upon movement of said keys, and means for yieldably moving said coupler about its pivot, said coupler having coupling portions so arranged that keys of banks other than those previously engaged with said coupler may be engaged therewith after said coupler has been moved to engaging position.

14. In a key operated cash register, pivoted depressible keys, a key coupler mounted for bodily and pivotal movement and normally maintained in inoperative position but movable into the path of movement of the said keys whereby the latter may be latched thereto, and an independent preset key for moving said key coupler bodily to permit pivotal movement from inoperative position into the path of movement of said keys whereby said keys may be latched thereto.

15. In a key operated cash register, pivoted depressible keys, a universal bail actuated thereby, a normally inoperative key coupler movable into the path of movement of said keys to latch all depressed keys thereto, means for moving the coupler into latching position upon movement of the bail by said keys and an independent preset key for moving said bail to permit said key coupler to move into latching position independently of any movement of said keys whereby keys may thereafter be latched thereto upon partial depression of said keys.

16. In a key operated cash register, pivoted depressible keys movable to preset position, a key coupler adapted to latch said keys thereto when partially depressed to preset position, means movable into a position for limiting movement of said keys to preset position, a preset key and connections thereto for simultaneously moving said limiting means into said position and moving said coupler to preset position.

17. In a key operated cash register, pivoted depressible keys, a key coupler adapted to latch said keys thereto when partially depressed to a predetermined preset position, a full stroke device for preventing return of said keys from partially depressed position, means for limiting movement of said keys to said preset position and means operable by said keys for setting said limiting means in position simultaneously with depression of said keys to preset position.

18. In a key operated cash register, pivoted depressible keys, a universal bail normally adjacent said keys and having portions in position to be engaged by said keys for movement therewith, means for moving said bail a predetermined distance to preset position independently of said key, means for holding said bail in preset position and a key coupler movable into the path of movement of said keys to latch said keys thereto, said bail serving as a limiting stop when moved independently of said keys, for engaging and limiting the movement of said keys to preset position.

19. In a key operated cash register, pivoted depressible keys movable to an intermediate preset position, a universal bail normally in contact with said keys and movable a predetermined distance relatively to said keys to a preset position, an independent key for moving said bail to preset position and a key coupler movable into the path of movement of said keys for latching all keys moved to preset position, said bail serving as a stop when in preset position for limiting movement of said keys to preset position.

20. In a key operated cash register, pivoted depressible keys, a normally inoperative key coupler, means for moving said coupler into the path of movement of said keys to cause the latter to be latched thereto, and an independent preset key for enabling said coupler to be moved from inoperative position to operative position in the path of movement of said keys by depression and release of said preset key and for moving said coupler from latching position to inoperative position upon depression and maintenance of pressure upon said preset key whereby keys latched to said coupler may be released therefrom.

WALTER J. PASINSKI.